Jan. 7, 1930.    J. W. HUGHES    1,742,767
SHROUDED ROTARY FISHING TOOL
Filed Aug. 10, 1927
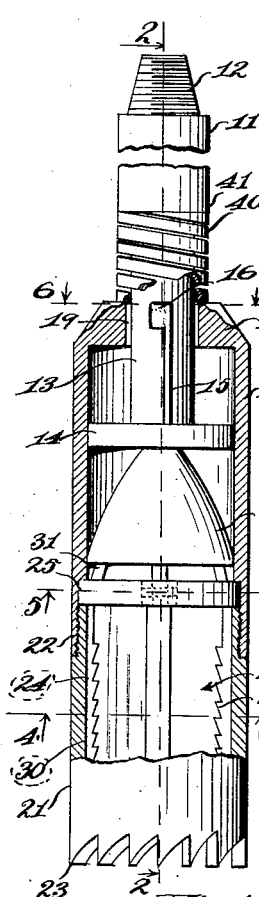
Fig.1.
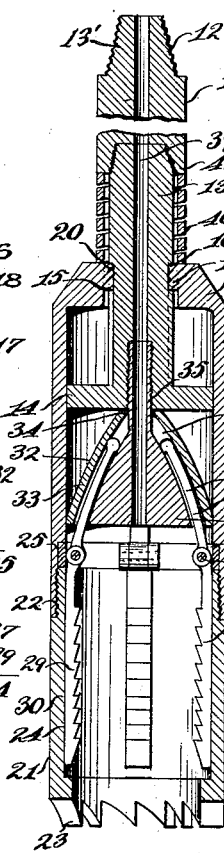
Fig.2.
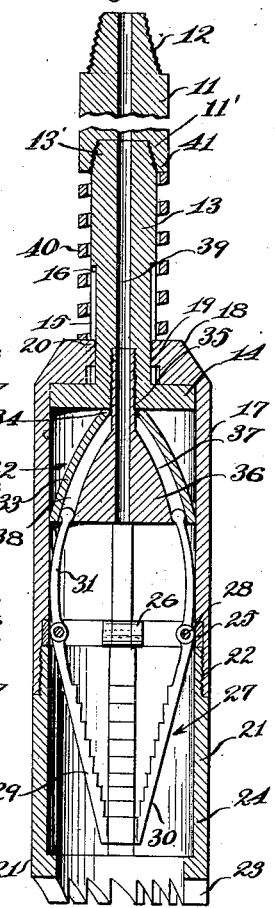
Fig.3.
Fig.4.    Fig.5.    Fig.6.
Inventor
J. W. Hughes
By Hazard and Miller
Attorneys Patented Jan. 7, 1930

1,742,767

UNITED STATES PATENT OFFICE

JESS W. HUGHES, OF LONG BEACH, CALIFORNIA

SHROUDED ROTARY FISHING TOOL

Application filed August 10, 1927. Serial No. 211,941.

My invention is a shrouded rotary fishing tool.

An object of my invention is the construction of a fishing tool of a rotary type in which the shroud or cutting tool surrounds the jaws of the fishing tool and in which a slight reverse movement releases an expanding device which forces the upper ends of the fishing jaws outwardly and the inner ends inwardly, to grip the article to be fished, and also in which a spring may function to aid this action.

Another object of my invention is the construction of a fishing tool in which the gripping jaws have upper curved extensions which fit inside of a bell of somewhat conical shape and pass over a wedge-shaped block having a curvature substantially similar to the inside of the bell, so that the upper end of the arms extending from the gripping jaws may follow an arcuate path caused by the movement of the bell and the wedge block, enforcing the jaws together.

Another object of my invention is having a drill rod with vertical grooves therein and a cross groove so that nubs on the casing which enclose the fishing jaws may slide in this groove, and when in the cross groove, will lock the jaws in their inoperative position to allow forcing of the tool into the well and rotating same to engage the fish. The drill rod is unlocked by a slight back turn.

Other objects of my invention will appear from the following description, and my invention is illustrated in the accompanying drawings, in which:

Figure 1 is a vertical section through the tool showing certain of the inside parts in elevation.

Figure 2 is a vertical section on the line 2—2 of Fig. 1 in the direction of the arrows, showing the tool in position for entering the well.

Figure 3 is a section similar to Fig. 2 showing the tool in position for lifting a fish.

Figure 4 is a horizontal section on the line 4—4 of Fig. 1 in the direction of the arrows.

Figure 5 is a section on the line 5—5 of Fig. 1 in the direction of the arrows.

Figure 6 is a section on the line 6—6 of Fig. 1 in the direction of the arrows.

In the drawings I indicate the sub 11 of a drill pipe which has a pin 12 on the top thereof and a downward extension 13 of less diameter than the main portion of the drill pipe. The lower end of this pipe is provided with a disk-like head 14 and above this head there are a pair of opposite vertical grooves 15 with cross or horizontal grooves 16 connecting thereto.

Connected to the lower part 13 of the sub there is a tubular casing 17 having an internal diameter slightly greater than the diameter of the head 14, and the top 18 of this casing has a central opening 19 therethrough to accommodate the sliding motion of the extension 13, there being a pair of nubs 20 which fit in the vertical grooves 15 on the extension 13 and may be shifted into the cross grooves 16.

A shroud or tubular drilling tool 21 is connected to the casing 17 by a screw-threaded connection 22 and this tool has cutting teeth 23 at the bottom. It is also provided with a vertical recess 24 for a purpose hereunder set forth.

A ring 25 is loosely retained between the lower end of the casing 17 and the upper part of the tubular shroud 21. This ring has a plurality of sets of ears 26 on which are mounted the fishing implements, designated generally by the numeral 27, by a pivotal connection 28. These fishing implements have serrated jaws 29 at the lower portion and are straight on the back or outside wall 30, being adapted to fit in the recess 24, as shown in Figs. 1 and 2. The upper ends of these implements have operating arms 31 each of which is formed in an arc.

The arms of the fishing tool fit between a bell 32 which has an arcuate inner surface 33, this being somewhat domed. The bell has an opening 34 at the top, through which extends the tubular stem 35 to which is secured the wedge block 36, the stem being preferably screw-threaded in the lower end 13 of the sub 11. The outer surface 37 of the wedge block is substantially complementary to the inner surface 33 of the bell, leaving a space 38 to accommodate the arms 31 of the fishing implements. There is a fluid passage 39 extending through the sub 11, the extension 13, the stem 35 and the wedge block 36 for a flushing fluid. There is a compression spring 40 surrounding the lower part 13 of the sub, fitting between the top 19 of the casing and the shoulder 41 on the sub 11.

The manner of operation and functioning of my shrouded rotary fishing tool is substantially as follows:

Before lowering the tool into the well, the lower end of the sub 11 is forced downwardly against the resistance of the compression spring 40, which action brings the nubs 20 upward in the groove 15 and by a slight turn these nubs enter the cross groove 16, thus holding the spring compressed and the lower part 13 of the sub extending downwardly into the casing, so that the disk 14 may occupy the position as illustrated in Figs. 1 and 2. This action carries the bell 32 downwardly and also the wedge block 36, which is a fixed distance from the bell, and the action forces the arms 31 upwardly in the space 38 between the bell and the wedge block and on account of the shape of the inner surface 33 of the bell, the jaw ends 29 are forced outwardly into the recess 24 of the shroud 21.

The whole tool can then be lowered into the well by a coupling of drill pipes or the like, and on striking the bottom, the device may be rotated so that the teeth 23 may cut into the formation. Presuming the tool is rotated in a right hand direction when the teeth strike the formation, this forces the nubs 20 out of the cross grooves 16 and into alignment with the vertical grooves 15. The rotation of the tool may be continued until a fish is forced inwardly, and if the fish contacts with the gripping jaws, these may remain stationary, while the shroud and the other parts of the fishing tool rotate around these gripping jaws. This is effected on account of the ring 25 having a loose fit and the jaws fitting into the recess 24. An upward pull on the lower part 11 of the drill pipe or the sub, pulls upwardly on the wedge block 36 and forces the jaws together. This action forces the arms 31 from the position shown in Figs. 1 and 2 to that of Fig. 3, and thereby moves the jaws 29 from the position shown in Figs. 1 and 2 to that shown in Fig. 3, thereby gripping the fish to be lifted to the surface of the well.

The sub 11 is divided into two parts having a box 11' which engages a pin 13' on the lower part 13. This construction allows the ready assembling of the device as the upper and lower part may be readily disconnected.

From the above description it will be seen that I have developed a simple fishing tool of the shrouded type, in which the arms for operating the jaws are positively guided by means of the wedging block and the bell, hence a positive action is given not only in closing the jaws upon the article to be fished, but also upon opening the jaws. Moreover, the device is secure from shifting into the clamping position from the inserting position, until a slight reverse movement has been given, or a movement releasing the nubs 20 from the cross groove 16.

Various changes may be made in the principles of my invention without departing from the spirit thereof, as set forth in the description, drawings and claims.

I claim:

1. A fishing tool comprising in combination a tubular casing open at its lower end, a plurality of arms pivotally mounted in the casing having gripping jaws, a movable means operating longitudinally in the casing having a space to accommodate the upper ends of the said arms, the movement of the said means downwardly spreading the jaws apart and upwardly pulling the jaws together and means releasable from a remote point for holding said movable means stationary within the casing.

2. A fishing tool comprising in combination a tubular casing open at the lower end having a top with an opening therethrough, a sub extending through said opening, a plurality of arms pivotally mounted in the casing and having gripping jaws at their lower ends, the upper part of the arms engaging a moving device connected to the lower end of the sub, said device having spaces to accommodate the upper ends of the said arms and its downward movement spreading the jaws apart and its upward movement pulling the jaws together and means releasable from a remote point for holding said moving device stationary within the casing.

3. A fishing tool comprising in combination a tubular casing open at its lower end and having a plurality of arms pivotally mounted therein, said arms having gripping jaws at their lower end, a downward extension of a sub extending through an opening in the top of the casing having a slidable and partly rotational movement therein, a jaw moving device in the casing connected to the lower end of the sub and having spaces to accommodate the upper ends of the said arms, said device being locked in its lower position with the jaws spread apart by interengagement of the lower part of the sub and the top of the casing, and being shiftable on a part rotation and elevation to draw the jaws together.

4. A fishing tool comprising in combination a tubular casing open at its lower end, a plurality of arms pivotally mounted in the casing and having gripping jaws at their lower ends and inwardly curved upper parts, a bell and a wedge block mounted in the casing and spaced apart to engage the upper parts of the arms, and means to move the bell and the wedge block simultaneously longitudinally of the casing whereby in their lower position the jaws are spread apart and in their upper position the jaws are pulled together.

5. A fishing tool comprising in combination a tubular casing open at the lower end and having a top with an opening therethrough, a plurality of arms pivotally mounted in the casing having jaws at their lower ends and inwardly curved upper parts, a lower end of the sub extending through the opening in the top of the casing, a bell and a wedge block connected to said end, the bell and wedge block being spaced apart to accommodate the curved parts of the arms, the bell and the block being movable longitudinally by the lower part of the sub and in their lower position holding the jaws apart and in their upper position pulling the jaws together.

6. A fishing tool, as claimed in claim 5, the wedge block having a stem rigidly secured to the lower end of the sub and the bell being loosely mounted on the said stem and outside of the block, the outside of the block and the inside of the bell having curved surfaces to accommodate the motion of the upper parts of the arms.

7. A fishing tool comprising in combination a tubular casing open at its lower end and having a top with an opening therethrough, a plurality of arms pivotally mounted in the casing having gripping jaws at their lower ends and inwardly curved upper ends, a lower part of the sub extending through the said opening in the top and having a nub and slot connection with the said top, the slot having a vertical and a short transverse section, the nub being adapted to fit in the transverse sections and hold the said sub in its lowest position, a spring surrounding the sub bearing on part of the sub and the upper part of the casing, and a device in the casing connected to the lower end of the sub adapted to engage the upper part of the said arms and in the lower position hold the jaws apart and in the upper position pull the jaws together.

8. A fishing tool, as claimed in claim 7, the device connected to the sub comprising a wedge block having a stem rigidly secured to the sub and a bell loosely mounted outside of the wedge block, the upper parts of said arms fitting between the wedge block and the bell, and means to prevent the bell having independent upward movement.

9. A fishing tool comprising in combination a tubular casing open at its lower end and having a top with an opening therethrough, a plurality of arms pivotally mounted in the casing and having gripping jaws at the lower ends and inwardly curved upper ends, a lower part of the sub extending through the opening in the top and having means to allow a sliding and partially turning movement, a head on the lower part of the said sub, a wedge block rigidly connected to the sub, a bell fitted over the block and being spaced therefrom by the upper ends of the said arms, the upper part of the bell engaging the said head on the sub, the bell and the block, when in a lower position, holding the jaws spread apart, and when in an upper position, pulling the jaws together.

10. A fishing tool comprising in combination a tubular casing having a top with an opening therein, a tubular shroud screw-threaded on the lower part of the casing and having a ring fitted at the said connection, a plurality of arms pivotally mounted on said ring and having jaws with straight backs extending downwardly therefrom, the upper parts of the arms being curved inwardly, the shroud having a recess to accommodate the said jaws when spread apart, the lower part of the sub extending through the opening in the top of the casing and having a nub and groove connection, the grooves being vertical with a short transverse part, a wedge block securely connected to the lower part of the sub, a bell fitted over the block and spaced therefrom by the upper ends of the arms, means to prevent the bell from shifting upwardly independently of the block, the block and the bell in their lower position holding the jaws fitting in the said grooves and in their upper position pulling the jaws together.

11. A fishing tool comprising in combination a tubular casing open at the lower end and having a top with an opening therethrough, a sub extending through said opening, a ring freely rotatable in the tubular casing, a wedge block secured to the sub and engaging a plurality of arms pivotally connected to the ring, the said arms having jaws at their lower ends, such jaws being freely rotatable with the ring and fitting in a recess in the tubular casing, and means slidable with the sub and the wedge block in the tubular casing engaging the outer upper ends of the arms.

12. A fishing tool comprising in combination a tubular casing open at its lower end, a plurality of arms pivotally mounted in the casing, gripping jaws on said arms, and movable means operating longitudinally in the casing, having a space to accommodate the upper ends of said arms said movable means engaging opposite sides of each arm, the movement of said means downwardly spreading the jaws apart, and upwardly, pulling the jaws together.

13. A fishing tool comprising a tubular casing open at its lower end, a plurality of arms pivotally mounted in said casing, gripping jaws on the lower ends of said arms, a sub having an extension extending through an opening in the top of said casing, said extension having a sliding and partially rotational movement in respect to the casing, a jaw-moving device in the casing connected to the lower end of the sub and having spaces to accommodate the upper ends of said arms, said device being locked in its lower position with the jaws spread apart by the inter-engagement of the lower part of the sub and the top of the casing, and being shiftable on a part rotation and elevation to draw the jaws together.

14. A fishing tool comprising in combination: a tubular casing open at its lower end, a ring loosely mounted in a recess in the bore of said casing, a plurality of arms pivoted to said ring, gripping jaws on said arms, and movable means operating longitudinally in the casing having a space to accommodate the upper ends of said arms, said movable means engaging opposite sides of both arms, the movement of said means downwardly spreading the jaws apart, and upwardly, pulling the jaws together.

In testimony whereof I have signed my name to this specification.

JESS W. HUGHES.